(12) United States Patent
Van Vugt (10) Patent No.: US 7,925,733 B2
(45) Date of Patent: Apr. 12, 2011

(54) GENERATING UNIQUE OBJECT IDENTIFIERS FOR NETWORK MANAGEMENT OBJECTS

(75) Inventor: Daniel P. Van Vugt, Innaloo (AU)

(73) Assignee: International Business Machines Corporation, Armonk, NY (US)

(*) Notice: Subject to any disclaimer, the term of this patent is extended or adjusted under 35 U.S.C. 154(b) by 598 days.

(21) Appl. No.: 11/954,770

(22) Filed: Dec. 12, 2007

(65) Prior Publication Data

US 2009/0157700 A1 Jun. 18, 2009

(51) Int. Cl.
*G06F 15/16* (2006.01)
(52) U.S. Cl. ..................... 709/223
(58) Field of Classification Search .......... 709/223, 709/230
See application file for complete search history.

(56) References Cited

U.S. PATENT DOCUMENTS

| 6,148,349 | A | 11/2000 | Chow et al. | |
|---|---|---|---|---|
| 7,085,480 | B1* | 8/2006 | James | 386/126 |
| 2006/0101138 | A1* | 5/2006 | Son | 709/223 |
| 2006/0235971 | A1* | 10/2006 | McCloghrie et al. | 709/225 |
| 2007/0106699 | A1* | 5/2007 | Harvey et al. | 707/200 |

OTHER PUBLICATIONS

Howes, T. et al., "The String Representation of Standard Attribute Syntaxes", <http://www.ietf.org/rfc/rfc1778.txt>,(Mar. 1995).
Blumenthal, U. et al., "User-based Security Model (USM) for version 3 of the Simple Network Management Protocol (SNMPv3)", <http://www.ietf.org/rfc/rfc3414.txt>,(Dec. 2002).

* cited by examiner

*Primary Examiner* — Wing F Chan
*Assistant Examiner* — Andrew Woo
(74) *Attorney, Agent, or Firm* — Yee & Associates, P.C.; Jeffrey S. LaBaw (57) ABSTRACT

Embodiments of the inventive subject matter use a radix-like counting technique to generate unique object identifiers (OIDs) for managed objects in accordance with a network management protocol. A limit value is utilized to ensure prefix uniqueness for an allocated object identifier. For a level in a managed objects tree with a maximum value of MAX, a suffix MAX-2 will be allocated for a unique object identifier and a suffix MAX-1 will be extended to allow allocation of unique object identifiers with MAX-1 in the prefix, while the suffix MAX-2 will not occur in a prefix for a unique object identifier. Embodiments of the inventive subject matter allow for generation of unique object identifiers in constant bound time O(1). Additionally, the number of OIDs generated is not limited by the maximum value of an integer $2^{32}-1$.

20 Claims, 7 Drawing Sheets

GENERATING UNIQUE OBJECT IDENTIFIERS FOR NETWORK MANAGEMENT OBJECTS

TECHNICAL FIELD

Embodiments of the inventive subject matter generally relate to the field of network management, and, more particularly, to the generation of unique object identifiers in accordance with a network management protocol.

BACKGROUND

In the Simple Network Management Protocol, an object identifier (OID) is an administratively assigned identifier that identifies managed objects. An OID is encoded as a string of 32-bit integers separated by periods in accordance with Abstract Syntax Notation One (ASN.1). An OID corresponds to a particular node in a Management Information Base, which uses a hierarchical namespace. Different organizations (e.g., International Business Machines Corporation (IBM®), assign and manage different levels of the Management Information Base hierarchy.

SUMMARY

Embodiments include a method that comprises determining a first object identifier value that corresponds to a previously generated object identifier. The first object identifier value is incremented to generate a second object identifier value. The second object identifier value is compared against a limit value to ensure prefix uniquess for an allocated object identifier A unique object identifier is allocated based on the second object identifier value if the second object identifier does not exceed a limit value. If the second object identifier value exceeds the limit value, the length of the second object identifier value is increased to generate a third object identifier value. A unique object identifier is allocated based on the third object identifier value. The unique object identifier identifies a managed object for network management. Allocation of the unique object identifier occurs in a constant bound time.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to the Simple Network Management (SNMP) protocol, embodiments may be implemented in accordance SNMPv1, SNMPv2, SNMPv3, or another network management protocol. In other instances, well-known instruction instances, protocols, structures and techniques have not been shown in detail in order not to obfuscate the description.

Embodiments of the inventive subject matter use a radix-like counting technique to generate unique object identifiers (OIDs) for managed objects in accordance with a network management protocol. A limit value is utilized to ensure prefix uniqueness for an allocated object identifier. For a level in a managed objects tree with a maximum value of MAX, a suffix MAX-2 will be allocated for a unique object identifier and a suffix MAX-1 will be extended to allow allocation of unique object identifiers with MAX-1 in the prefix, while the suffix MAX-2 will not occur in a prefix for a unique object identifier. Embodiments of the inventive subject matter allow for generation of unique object identifiers in constant bound time O(1). Additionally, the number of OIDs generated is not limited by the maximum value of an integer $2^{32}-1$.

Figure 1:
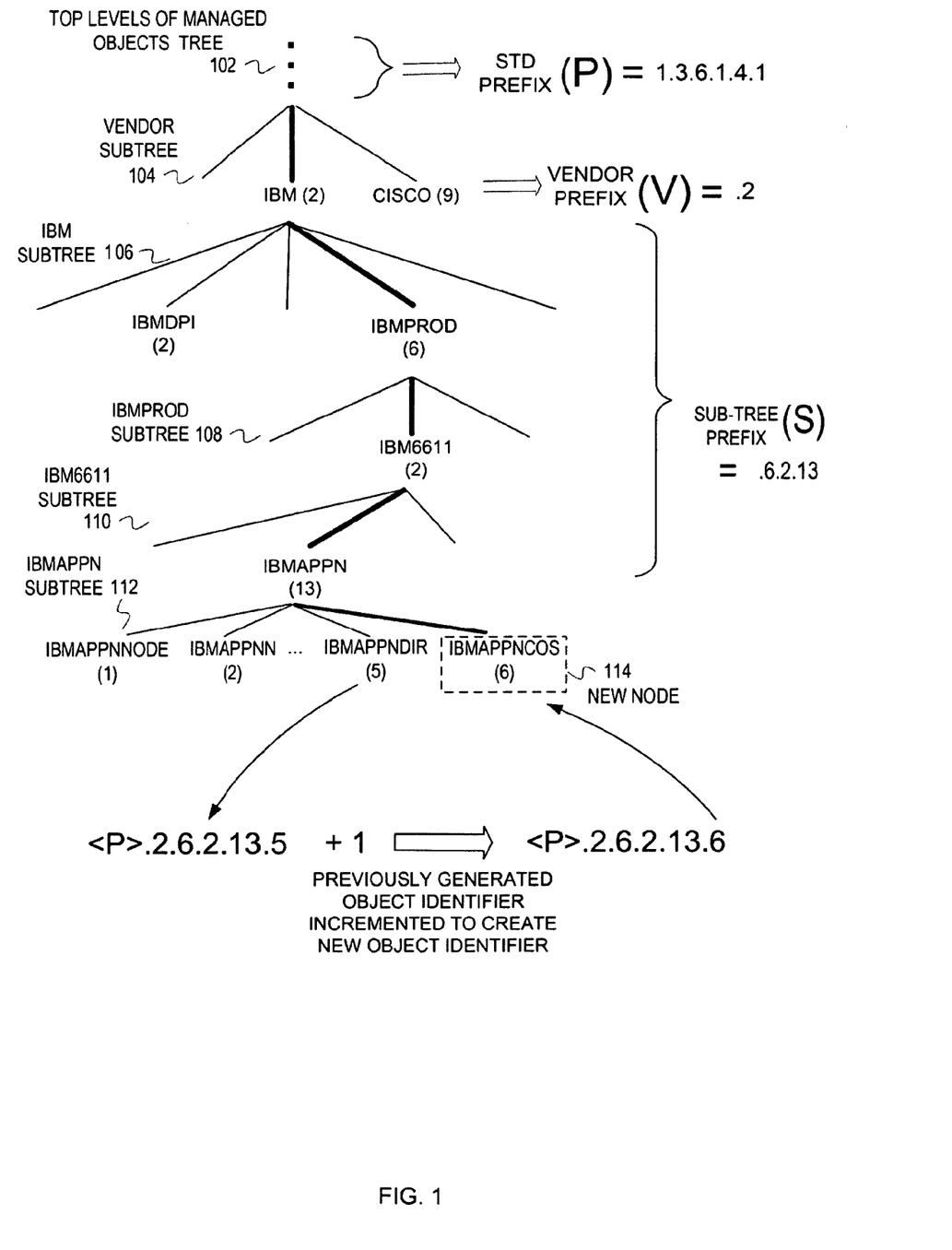
FIG. 1 illustrates an example of incrementing a value to generate a unique object identifier.

FIG. 1 illustrates an example of incrementing a value to generate a unique object identifier. FIG. 1 depicts an example managed objects tree for network management. In this example, the managed objects tree includes top levels 102, which correspond to standard top levels of a managed objects tree. The tree also includes a vendor sub-tree 104, an IBM sub-tree 106, an IBMPROD sub-tree 108, an IBM6611 sub-tree 110, and an IBMAPPN sub-tree 112. The vendor sub-tree 104 contains nodes depicted for objects IBM (2) and Cisco (9). A path through the top levels 102 to the IBM node and the IBM sub-tree 106 is represented with a standard prefix (P) 1.3.6.1.4.1.

Each of the sub-trees includes one or more nodes. The IBM sub-tree 106 contains nodes for objects IBMDPI (2) and IBMPROD (6). The IBMPROD sub-tree 108 contains a node for an object IBM6611(2). The IBM6611 sub-tree 110 contains a node for an object IBMAPPN (13). The IBMAPPN sub-tree 112 contains a series of nodes for objects IBMAPPNNODE (1), IBMAPPNN (2), and IBMAPPNDIR (5).

A new object IBMAPPNCOS is to be defined in the IBMAPPN sub-tree 112. The new object will be identified by a unique object identifier. The prefix for the unique object identifier will include the standard prefix <P>, the vendor prefix (V) for IBM (i.e., 2), and a sub-tree prefix (S) that represents the path from the vendor node IBM to the new node. In FIG. 1, the edges in the path have been emphasized with thicker lines. The prefix for the new object is 1.3.6.1.4.1.2.6.2.13, which can be represented as <P>.<V>.<S>.

The unique object identifier to be generated and allocated for the new object is based upon a previously generated object identifier. The previously generated object identifier was 1.3.6.1.4.1.2.6.2.13.5 for the object IBMAPPNDIR. The suffix of the previously generated object identifier is incremented by one from five to six to create the unique object identifier 1.3.6.1.4.1.2.6.2.13.6 for the new object IBMAPPNCOS. A new node 114 is then created in the tree. The new node 114 represents the new object IBMAPPNCOS (6).

Figure 2:
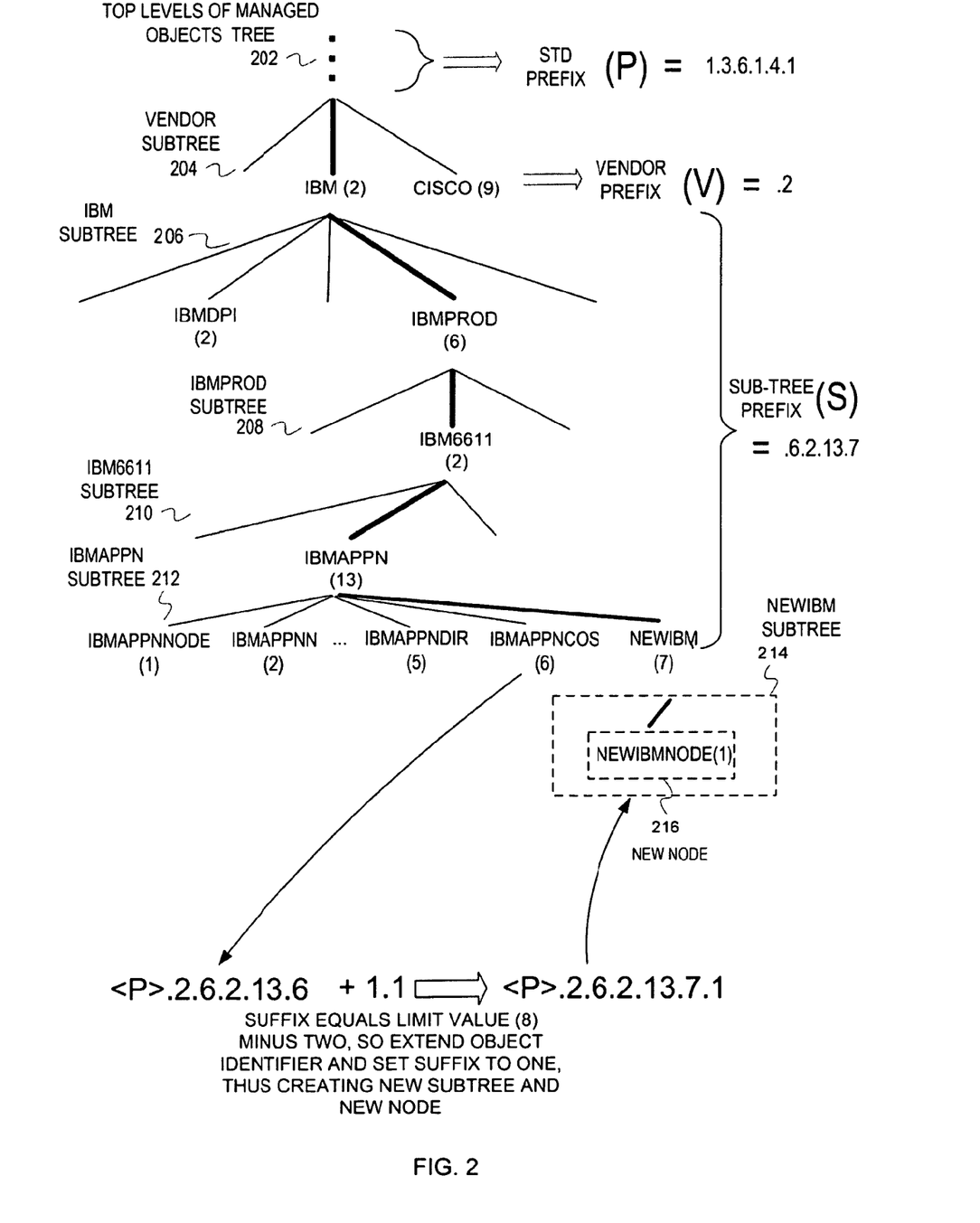
FIG. 2 illustrates an example of incrementing and extending a value to generate a unique object identifier.

FIG. 2 illustrates an example of incrementing and extending a value to generate a unique object identifier. FIG. 2 depicts an example managed objects tree for network management. In this example, the managed objects tree includes top levels 202, which correspond to standard top levels of a managed objects tree. The tree also includes a vendor sub-tree 204, an IBM sub-tree 206, an IBMPROD sub-tree 208, an IBM6611 sub-tree 210, and an IBMAPPN sub-tree 212. The vendor sub-tree 204 contains nodes depicted for objects IBM (2) and Cisco (9). A path through the top levels 202 to the IBM node and the IBM sub-tree 206 is represented with a standard prefix (P) 1.3.6.1.4.1.

Each of the sub-trees includes one or more nodes. The IBM sub-tree 206 contains nodes for objects IBMDPI (2) and IBMPROD (6) nodes. The IBMPROD sub-tree 208 contains a node for an object IBM6611 (2). The IBM6611 sub-tree 210 contains a node for an object IBMAPPN (13). The IBMAPPN sub-tree 212 contains a series of nodes for objects IBMAPP-NNODE (1), IBMAPPNN (2), IBMAPPNDIR (5), and IBMAPPNCOS (6).

A new object NEWIBMNODE is to be defined. The new object will be identified by a unique object identifier. The prefix for the unique object identifier will include the standard prefix <P>, the vendor prefix (V) for IBM (i.e., 2), and a sub-tree prefix (S) that represents the path from the vendor node IBM to the new node. In FIG. 2, the edges in the path have been emphasized with thicker lines.

The unique object identifier to be generated and allocated for the new object is based upon a previously generated object identifier. The previously generated object identifier was 1.3.6.1.4.1.2.6.2.13.6 for the object IBMAPPNCOS. In FIG. 2, when allocating the unique object identifier for the object NEWIBMNODE, it is determined that the suffix of the previously generated object identifier is equal to a predefined value, which is eight, minus two. The predefined value can be determined by a system administrator, standard script, or another program. If the suffix value is equal to the predefined value minus two, the object identifier will be extended. Extending involves increasing the length of the object identifier value and setting the suffix of the extended or lengthened object identifier value. The suffix of the previously generated object identifier is incremented by one from six to seven. Thus, the new object NEWIBMNODE is identified by unique object identifier 1.3.6.1.4.1.2.6.2.13.7.1.

Updating the managed objects tree to include an entry for the new object NEWIBMNODE involves creation of two additional nodes, one of which is a root for a new sub-tree. The managed objects tree is modified to include a node NEWIBM (7) in the IBMAPPN sub-tree 212. Beneath this new node, another new node 216 is created for the object NEWIBMNODE, thus making the node for the object NEWIBM a root for a new sub-tree 214. The new node 216 includes the definition for the new object NEWIBMNODE (1).

Figure 3:
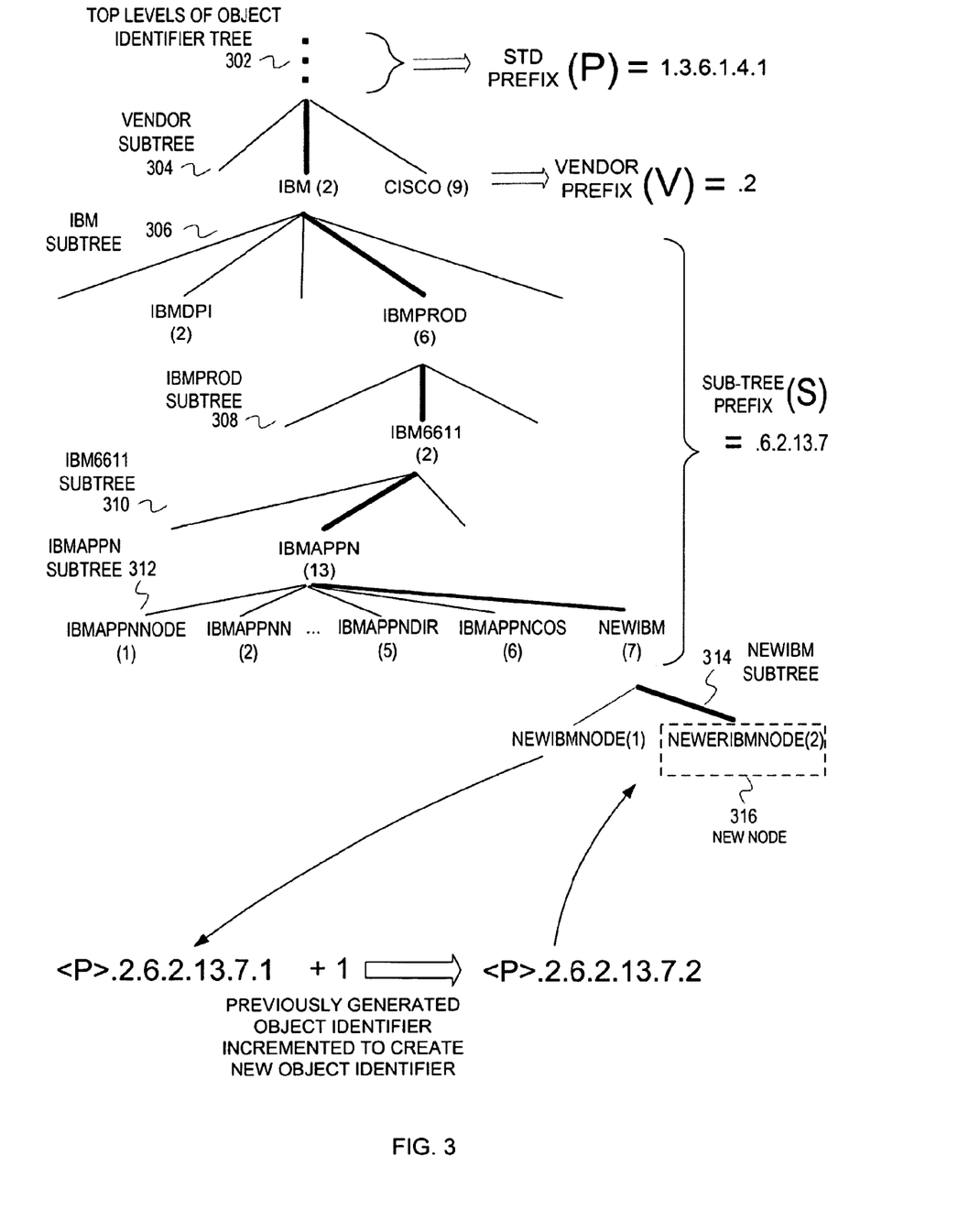
FIG. 3 illustrates an example of incrementing a value to generate a unique object identifier in a new sub-tree.

FIG. 3 illustrates an example of incrementing the extended value to generate a unique object identifier. In this example, the managed objects tree includes top levels 302, which correspond to standard top levels of a managed objects tree. The tree also includes a vendor sub-tree 304, an IBM sub-tree 306, an IBMPROD sub-tree 308, an IBM6611 sub-tree 310, an IBMAPPN sub-tree 312, and a NEWIBM sub-tree 314. The vendor sub-tree 304 contains nodes depicted for objects IBM (2) and Cisco (9). A path through the top levels 302 to the IBM node and the IBM sub-tree 306 is represented with a standard prefix (P) 1.3.6.1.4.1.

Each of the sub-trees includes one or more nodes. The IBM sub-tree 306 contains nodes for objects IBMDPI (2) and IBMPROD (6). The IBMPROD sub-tree 308 contains a node for an object IBM6611 (2). The IBM6611 sub-tree 310 contains a node for an object IBMAPPN (13). The IBMAPPN sub-tree 312 contains a series of nodes for objects IBMAPP-NNODE (1), IBMAPPNN (2), IBMAPPNDIR (5), IBMAP-PNCOS (6), and NEWIBM (7). The NEWIBM sub-tree 314 contains a node for an object NEWIBMNODE (1).

A new object NEWERIBMNODE is to be defined in the NEWIBM sub-tree 314. The new object will be identified by a unique object identifier. The prefix for the unique object identifier will include the standard prefix <P>, the vendor prefix (V) for IBM (i.e., 2), and a sub-tree prefix (S) that represents the path from the vendor node IBM to the new node. In FIG. 3, the edges in the path have been emphasized with thicker lines. The prefix for the new object is 1.3.6.1.4.1.2.6.2.13.7, which can be represented as <P>.<V>.<S>.

The unique object identifier to be generated and allocated for the new object is based upon a previously generated object identifier. The previously generated object identifier was 1.3.6.1.4.1.2.6.2.13.7.1 for the object NEWIBMNODE. The suffix of the previously generated object identifier is incremented by one from one to two to create the unique object identifier 1.3.6.1.4.1.2.6.2.13.7.2 for the new object NEW-ERIBMNODE. A new node 316 is then created in the tree. The new node 316 represents the new object NEWERIBM-NODE (2).

Although not shown in FIGS. 1, 2, and 3, all sub-trees can include other standardized nodes, or in some cases, vendor defined nodes. For example, IBM sub-tree 106, 206, and 306 can include nodes such as IBMWIN32, IBMTPIP, IBMDOC, etc. Additionally, different paths may be followed in an object identifier tree, which allows for different sub-trees, different nodes, and a variety of generated unique object identifier possibilities.

Figure 4:
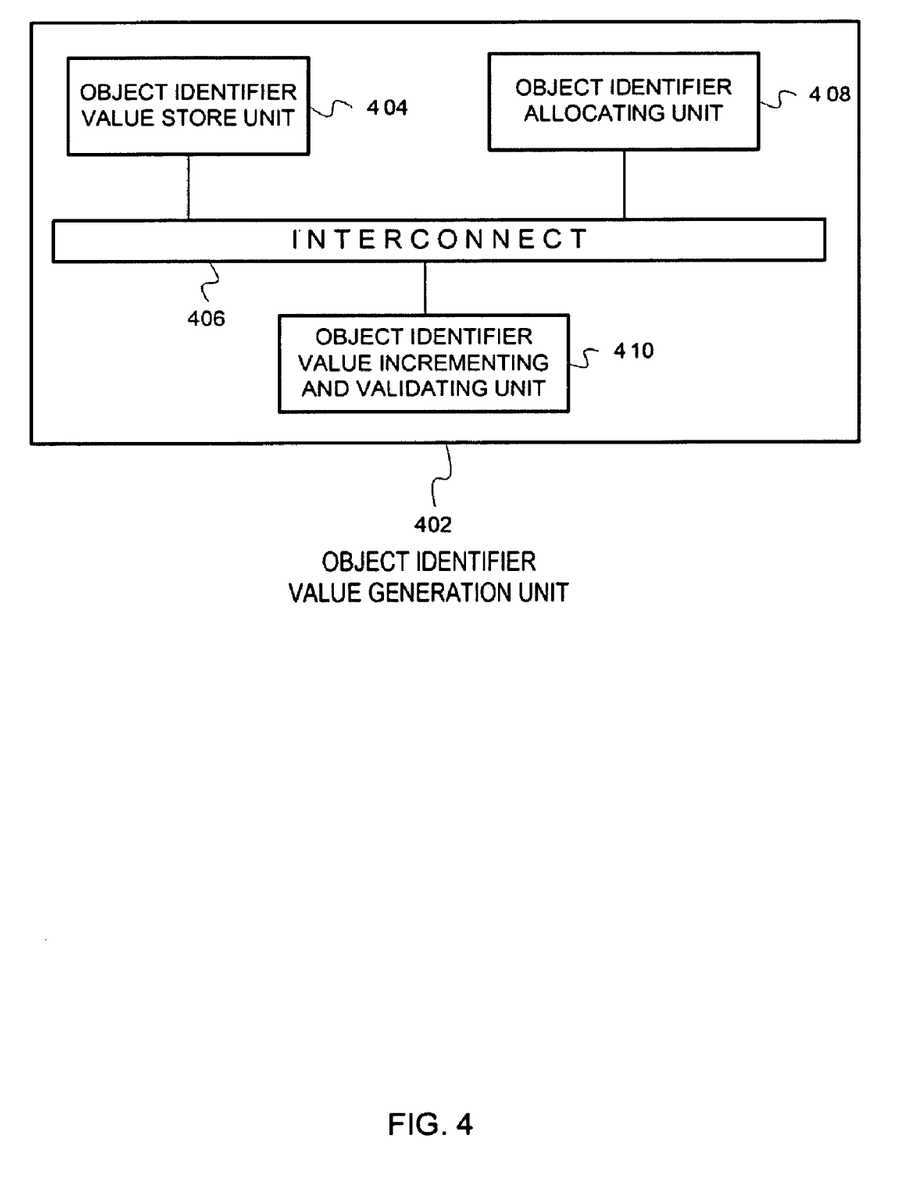
FIG. 4 illustrates an object identifier value generation unit.

FIG. 4 illustrates an example object identifier value generation unit. An object identifier value generation unit 402 includes an object identifier value store unit 404, an object identifier allocating unit 408, and an object identifier value incrementing and validating unit 410. The units 404, 408, and 410 communicate over an interconnect 406.

The object identifier value store unit 404 is operable to store previously generated object identifier values. Examples of previously generated object identifier values include previously allocated object identifier values, previously generated object identifier values that were candidates for allocation but failed validation, etc.

The object identifier allocating unit 408 is operable to allocate values generated by the unit 410 as object identifiers. In embodiments, allocation can be requested by a system administrator, programmer, external software, or another program.

The object identifier value incrementing and validating unit 410 is operable to increment an object identifier value retrieved from the object identifier value store unit 404 and operable to validate object identifier values as unique object identifiers. The object identifier value incrementing and validating unit 410 increments the object identifier value retrieved from the object identifier value store unit 404 to avoid collisions with previously allocated object identifiers. The object identifier value unit incrementing and validating unit 410 also determines if the value exceeds a predefined limit. This determination ensures that a value to be allocated as an object identifier does not become a prefix for another object identifier, thus avoiding conflicts between object identifiers regardless of the suffix. The object identifier value incrementing and validating unit 410 also validates values before allocation as object identifiers to ensure that the values comport with standards. The unit 410 can perform the incrementing and validating in different orders. The limit value employed by the unit 410 to ensure prefix uniqueness of an object identifier can vary with implementation.

Although not shown in FIG. 4, the object identifier value generation unit 402 may include other components. In addition, functionality may be realized differently than depicted in FIG. 4. For example, the operations performed by units 408 and 410 may be performed by a single unit. Moreover, the example object value generation unit 410 may not include the unit 408 and/or the store unit 404. The object identifier value generation unit 402 can generate valid values to be used for allocation of unique object identifiers. The object identifier value generation unit 402 passes the validated value to another unit for allocation.

Figure 5:
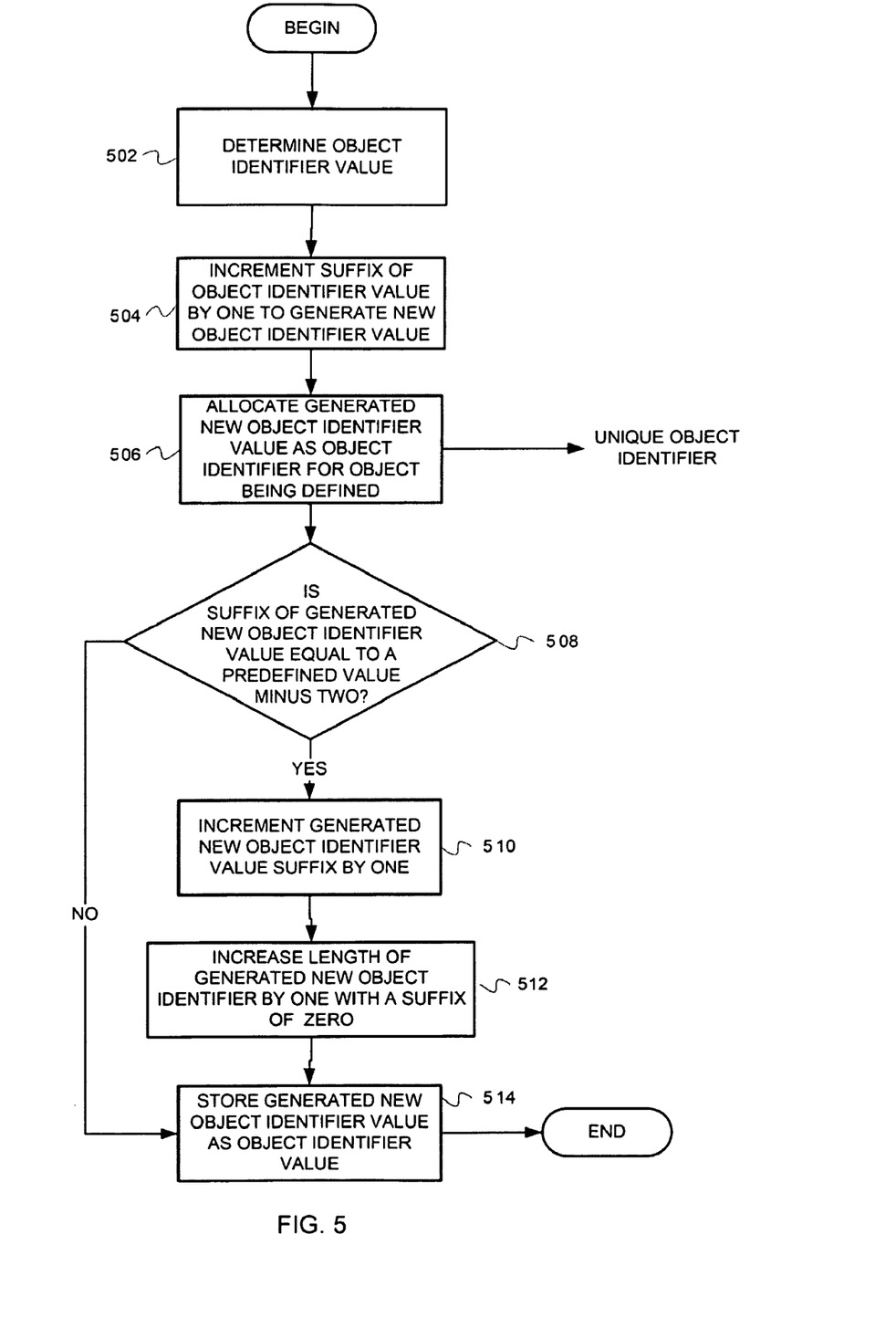
FIG. 5 depicts a flow diagram of example operations for generating a unique object identifier.

FIG. 5 depicts a flow diagram of example operations for generating a unique object identifier. At block 502, an object identifier value is determined. At block 504, a suffix of the determined object identifier value is incremented by one to generate a new object identifier value. At block 506, the generated new object identifier value is allocated as a unique object identifier for an object being defined. Allocation of the unique object identifier involves, or leads to, creating a new node for the object being defined. The new node is identified with the new unique object identifier. Data is written to the new node that defines the object (e.g., object type, object descriptor, etc.). At block 508, it is determined if the suffix of the generated new object identifier value is equal to a predefined value minus two. If the suffix of the generated new object identifier value is equal to the predefined value minus two, then control flows to block 510. If the suffix of the generated new object identifier value is not equal to the predefined value minus two, then control flows to block 514.

At block 510, the suffix of the generated new object identifier value is incremented by one. Incrementing creates a new node within the same sub-tree. The node created subsequently becomes the root of a new sub-tree within the object identifier tree. Control flows from block 510 to block 512. At block 512, the length of the generated new object identifier is increased by one with a suffix of zero. Increasing the length automatically creates a new sub-tree within the object identifier tree. Control flows from block 512 to block 514.

At block 514, the generated new object identifier value is stored as an object identifier value. From block 514, control ends.

Figure 6:
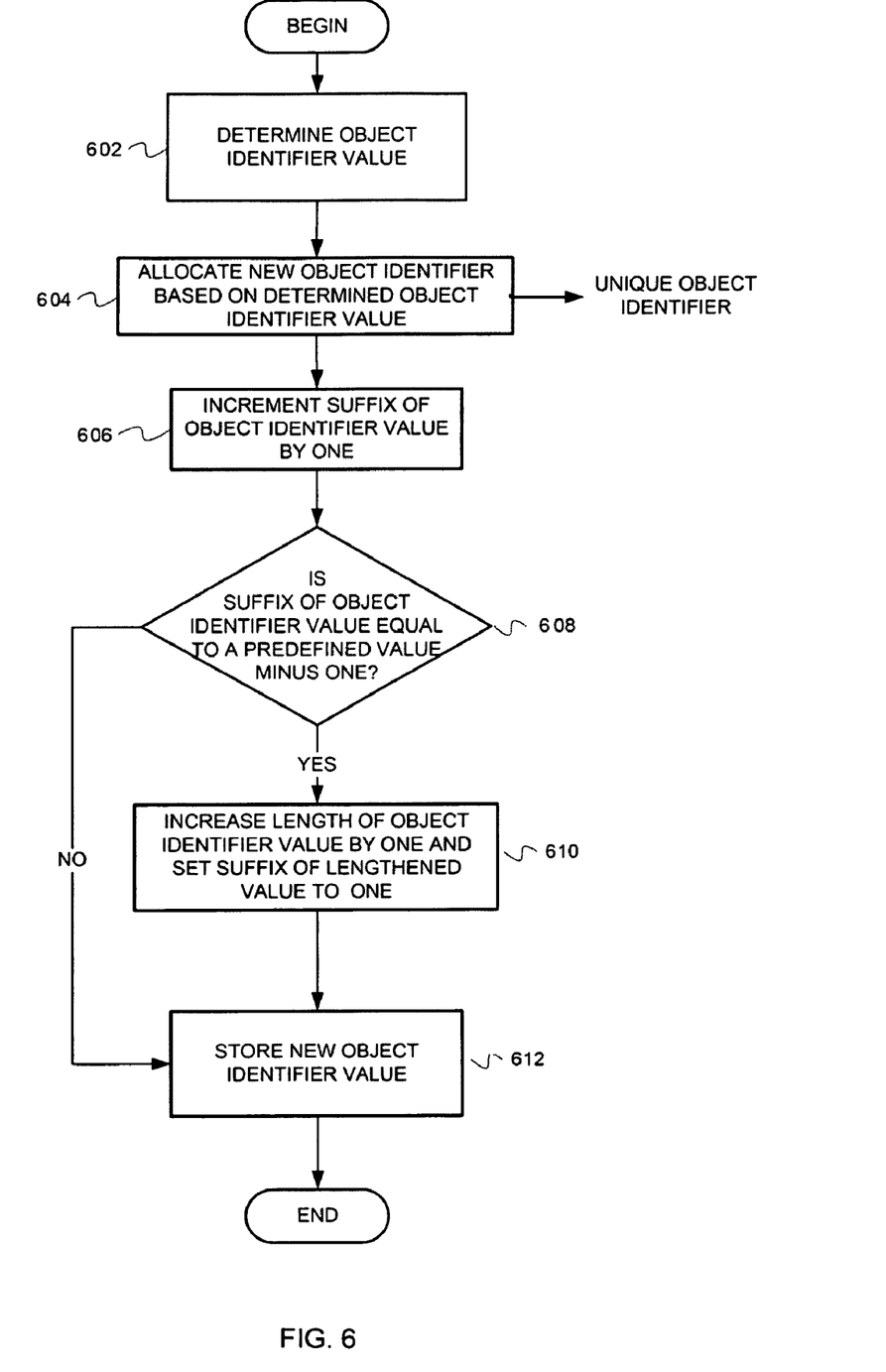
FIG. 6 depicts a flow diagram of example operations for generating a unique object identifier.

FIG. 6 depicts a flow diagram of example operations for generating a unique object identifier. At block 602, an object identifier value is determined. At block 604, a new object identifier is allocated based on the determined object identifier value. Allocation of the object identifier involves, or leads to, creating a new node for the object being defined. The new node is identified with the object identifier value. Data is written to the new node that defines the object (e.g., object type, object descriptor, etc.). At block 606, a suffix of the determined object identifier value is incremented by one. At block 608, it is determined if the suffix of the object identifier value is equal to a predefined value minus one. If the suffix of the object identifier value is equal to the predefined value minus one, then control flows to block 610. If the suffix of the object identifier value is not equal to the predefined value minus one, then control flows to block 612.

At block 610, the length of the object identifier value is increased by one with a suffix of one. Increasing length leads to creation of a new sub-tree. Control flows from block 610 to block 612.

At block 612, the object identifier value (either incremented or extended) is stored. Control ends after block 612.

The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Figure 7:
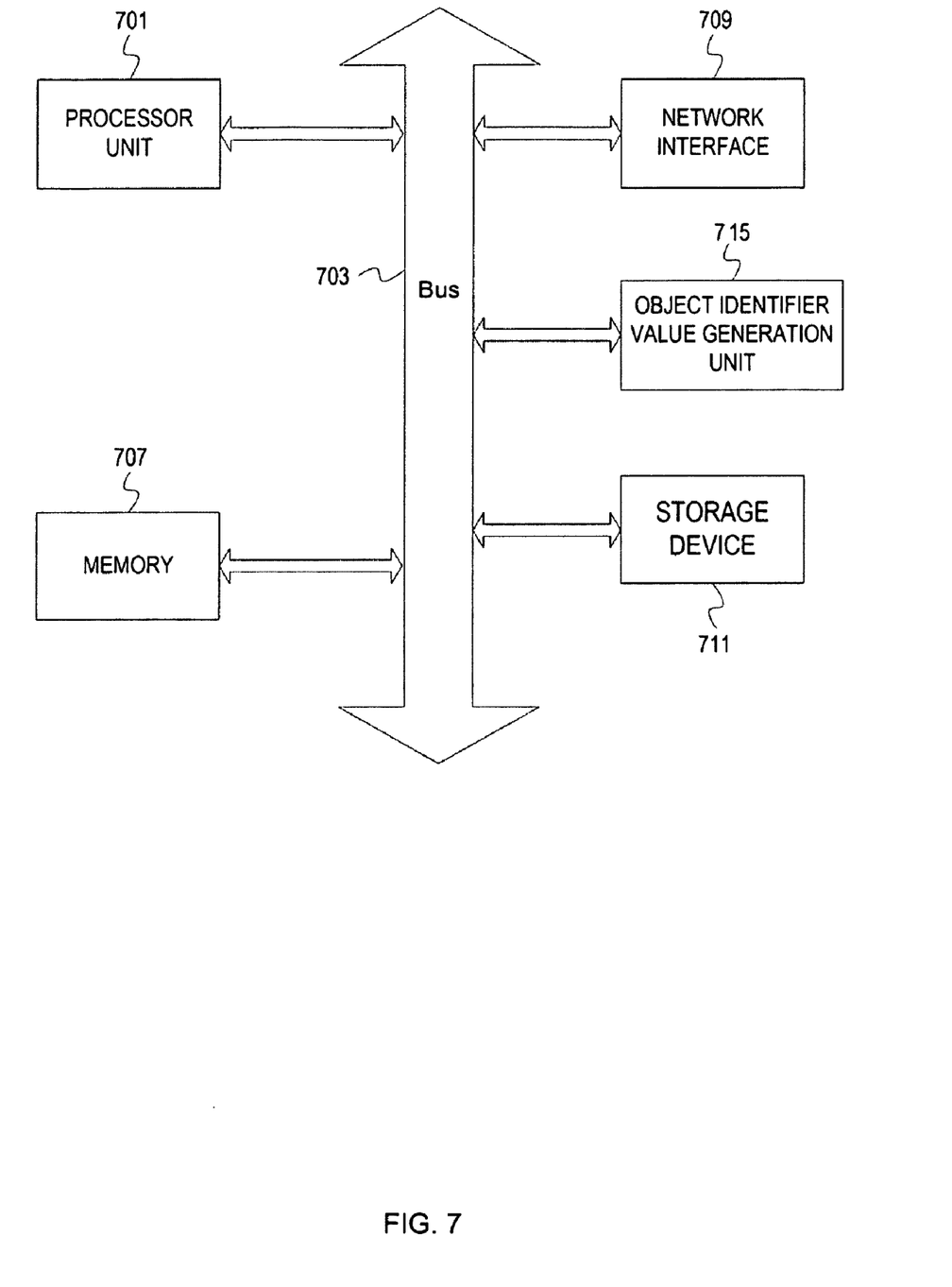
FIG. 7 depicts an example computer system.

FIG. 7 depicts an example computer system. A computer system includes a processor unit 701 (possibly including multiple processors, multiple cores, multiple nodes, and/or implementing multi-threading, etc.). The computer system includes memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 703 (e.g., PCI, ISA, PCI-Express, HyperTransport®, InfiniBand®, NuBus, etc.), a network interface 709 (e.g., an ATM interface, an Ethernet interface, a Frame Relay interface, SONET interface, wireless interface, etc.), and a storage device(s) 711 (e.g., optical storage, magnetic storage, etc.). The system also includes an object identifier value generation unit 715, which may be implemented as described above. Some or all of the functionality of the object identifier value generation unit 715 may be implemented with code embodied in the memory and/or processor, co-processors, other cards, etc. Any one of these functionalities may be partially (or entirely) implemented in hardware and/or on the processor unit 701. For example, the functionality may be implemented with an application specific integrated circuit, in logic implemented in the processor unit 701, in a co-processor on a peripheral device or card, etc. Further, realizations may include fewer or additional components not illustrated in FIG. 7 (e.g., video cards, audio cards, additional network interfaces, peripheral devices, etc.). The processor unit 701, the storage device(s) 711, and the network interface 709 are coupled to the bus 703. Although illustrated as being coupled to the bus 703, the memory 707 may be coupled to the processor unit 701.

While the embodiments are described with reference to various implementations and exploitations, it will be understood that these embodiments are illustrative and that the scope of the inventive subject matter is not limited to them. In general, techniques for unique object identifier generation as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:
1. A method performed by a computer comprising:
the computer determining a first object identifier value that corresponds to a previously generated object identifier;
the computer incrementing the first object identifier value to generate a second object identifier value;

the computer comparing the second object identifier value against a predefined positive limit value to ensure prefix uniqueness of an allocated object identifier;

the computer allocating a unique object identifier based on the second object identifier value if the second object identifier value does not exceed the predefined positive limit value;

if the second object identifier value exceeds the predefined positive limit value, the computer increasing a length of the second object identifier value to generate a third object identifier value and allocating a unique object identifier based on the third object identifier value, wherein the unique object identifier identifies a managed object for network management, wherein the unique object identifier is allocated in a constant bound time.

2. The method of claim 1, wherein the managed object comports with one of SNMPv 1, SNMPv2, and SNMPv3.

3. The method of claim 1 further comprising adding an entry in a managed object tree for the managed object, said adding being in accordance with the allocated unique object identifier.

4. The method of claim 3, wherein the entry comprises a definition for the managed object and the unique object identifier.

5. The method of claim 1, wherein the predefined positive limit value comprises one of a predefined value minus one and a predefined value minus two.

6. The method of claim 1, wherein the previously generated object identifier comprises a last allocated unique object identifier.

7. A method performed by a computer comprising:

the computer determining that a suffix of a last allocated unique object identifier has reached a predefined positive limit value;

the computer generating a second unique object identifier with a length greater than the last allocated unique object identifier to ensure prefix uniqueness of the second unique object identifier, wherein the second unique object identifier is generated in a constant bound time;

the computer associating the second unique object identifier with an object;

the computer creating a first node in a managed objects tree for the object, wherein the first node is at a different level than a second node that corresponds to the last allocated unique object identifier; and the computer storing a definition of the object and at least a suffix of the second unique object identifier in the first node, wherein the definition comports with a network management protocol.

8. The method of claim 7, wherein the predefined positive limit value comprises one of a predefine value minus one and a predefined value minus two.

9. The method of claim 8, wherein the predefined value comprises a maximum value predefined for an object identifier with a length of the last allocated unique object identifier.

10. An apparatus comprising:

a set of one or more processor units;

an object identifier value store unit operable to store an object identifier value that corresponds to a previously allocated unique object identifier;

an object identifier value incrementing and validating unit coupled with the object identifier value store unit, the object identifier value incrementing and validating unit operable to compare the object identifier value stored in the object identifier value store unit against a predefined positive limit value to ensure prefix uniqueness of an allocated object identifier, and operable to determine that the object identifier value stored in the object identifier value store unit exceeds the predefined positive limit value, to increase length of the object identifier value; and an object identifier allocating unit coupled with the object identifier value incrementing and validating unit, the object identifier allocating unit operable to allocate the object identifier value with the length increased by the object identifier value incrementing and validating unit as a unique object identifier that identifies a managed object for network management, wherein the object identifier value is allocated in a constant bound time.

11. The apparatus of claim 10, wherein the object identifier value incrementing and validating unit is further operable to increment a suffix of the object identifier value unit by one.

12. The apparatus of claim 11, wherein the object identifier value incrementing and validating unit is further operable to set a suffix of the lengthened object identifier value to one of zero and one.

13. The apparatus of claim 10, wherein the object identifier allocating unit is further operable to request creation of a node in a managed objects tree, the node to be identified with the allocated unique object identifier.

14. The apparatus of claim 13, wherein the object identifier allocating unit is further operable to request a definition of the managed object be written into the node identified with the allocated unique object identifier.

15. A non-transitory machine-readable medium including instructions that when executed by a machine cause the machine to perform operations comprising:

determining a first object identifier value that corresponds to a previously generated object identifier;

incrementing the first object identifier value to generate a second object identifier value;

comparing the second object identifier value against a predefined positive limit value to ensure prefix uniqueness of an allocated object identifier;

allocating a unique object identifier based on the second object identifier value if the second object identifier value does not exceed the predefined positive limit value;

if the second object identifier value exceeds the predefined positive limit value, increasing length of the second object identifier value to generate a third object identifier value and allocating a unique object identifier based on the third object identifier value, wherein the unique object identifier identifies a managed object for network management, wherein the unique object identifier is allocated in a constant bound time.

16. The machine-readable medium of claim 15, wherein the managed object comports with one of SNMPv1, SNMPv2, and SNMPv3.

17. The machine-readable medium of claim 15, wherein the operations further comprise adding an entry in a managed object tree for the managed object, said adding being in accordance with the allocated unique object identifier.

18. The machine-readable medium of claim 17, wherein the entry comprises a definition for the managed object and the unique object identifier.

19. The machine-readable medium of claim 15, wherein the predefined positive limit value comprises one of a predefined value minus one and a predefined value minus two.

20. The machine-readable medium of claim 19, wherein the previously generated object identifier comprises a last allocated unique object identifier.

* * * * *